United States Patent Office 3,116,303
Patented Dec. 31, 1963

3,116,303
NOVEL 16β-ALKYL STEROIDS AND PROCESSES
David Taub, Metuchen, Norman L. Wendler, Summit, and Harry L. Slates, Madison, N.J., assignors to Merck & Co., Inc., Rahway, N.J., a corporation of New Jersey
No Drawing. Original application Mar. 19, 1958, Ser. No. 722,390. Divided and this application Mar. 1, 1960, Ser. No. 11,981
2 Claims. (Cl. 260—397.45)

This invention is concerned generally with novel steroid compounds and with processes of preparing the same, more particularly, it relates to 16β-alkyl-11-oxygenated steroids of the pregnane series unsaturated in ring A. It relates also to novel processes for producing 16β-alkyl steroids as well as 16α-alkyl steroids.

This application is a division of application Serial No. 722,390, filed March 19, 1958.

The new products of our invention may be represented by the following structural formula:

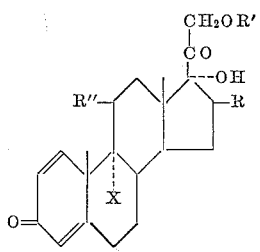

where R is alkyl, R' is hydrogen or acyl, R'' is hydroxy or oxygen, and X is hydrogen or halogen. The broken line between carbon atoms 1 and 2 indicates that a double bond may be present in this position.

The 16β-alkyl steroids produced in accordance with the present invention possess extremely high anti-inflammatory activity, considerably greater than that of the parent steroids, and are especially effective for the treatment of arthritis and related diseases since they can be administered for their cortisone-like action in extremely low dosage thereby minimizing undesired side effects. The activity of 16 beta-alkyl steroids is especially novel as all previous group substitution modifications of cortical steroids which have resulted in increased anti-inflammatory activity have involved introduction of alpha-substituents.

In preparing our novel chemical compounds, the starting material utilized may be a 3-substituted-11-oxygenated-16-pregnene-20-one or 3-substituted-11-oxygenated-16-allopregnene-20-one which may be identified by the following structural formula—

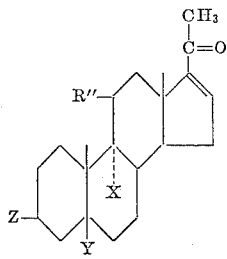

wherein X is hydrogen or halogen, Y is alpha or beta hydrogen, Z is oxygen, dioxolane, alpha or beta acyloxy or hydroxy, and R'' is hydroxy or oxygen as above, with or without a double bond at the 5(6)-position.

In a preferred embodiment of our invention, 3α-acetoxy-16-pregnene-11,20-dione which is represented by the following formula—

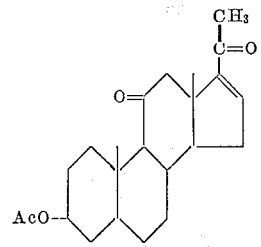

is utilized as the starting material. However, it is clear to those skilled in the art that other starting materials, such as those described above, may be similarly converted to the desired end products.

It has been found that 3α-acetoxy-16-pregnene-11,20-dione may be caused to react with diazoalkanes, such as diazomethane and diazoethane to form 3α-acetoxy-16α,17α-alkyleneazopregnane-11,20-dione which has the following structural formula—

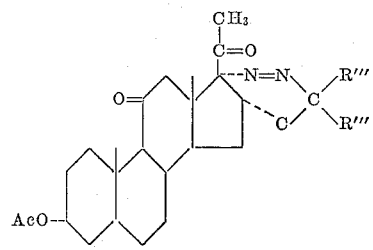

wherein R''' is hydrogen or alkyl.

Upon heating 3α-acetoxy-16α,17α-alkyleneazopregnane-11,20-dione, there is formed primarily 3α-acetoxy-16-alkyl-16-pregnene-11,20-dione which may be represented by the following formula—

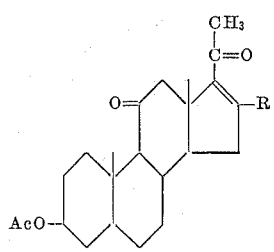

wherein R is alkyl as above.

Heating 3α-acetoxy-16α,17α-alkyleneazopregnane-11,20-dione also results in the formation of a small quantity of each of the two corresponding isomeric forms namely, the cyclopropane, 3-acetoxy-16α,17α-alkylenepregnane-11,20-dione, which has the following structural formula—

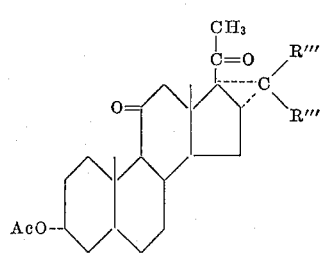

wherein R''' is hydrogen or alkyl and exocyclic olefin, 3-acetoxy-16-alkylene-pregnane-11,20-dione, which may be represented by the formula—

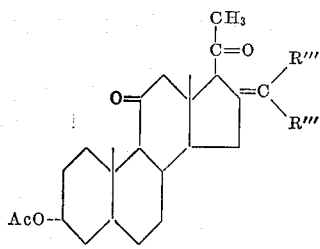

where R''' is hydrogen or alkyl as above.

Treatment of the above isomeric form, namely the 3-acetoxy-16-alkylenepregnane-11,20-dione with an alkali hydroxide yields 16α-alkyl-3α-hydroxy-16-pregnene-11,20-dione which has the formula—

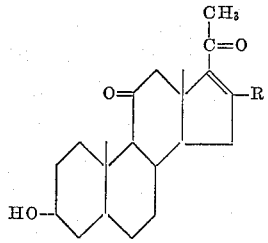

wherein R is alkyl.

Oxidation of 3α-acetoxy-16-alkyl-16-pregnene-11,20-dione, the major isomer obtained above, with an oxidizing agent such as hydrogen peroxide in the presence of sodium hydroxide or peracids such as peroxytrifluoracetic acid results in the formation of 16β-alkyl-16α,17α-epoxy-3α-hydroxypregnane-11,20-dione which has the structural formula—

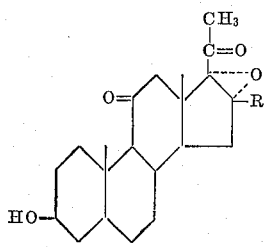

wherein R is as above.

Upon treatment of 16β-alkyl-16α,17α-epoxy-3α-hydroxypregnane-11,20-dione with a strong acid such as perchloric acid there is formed an olefin mixture of 16-alkyl-3α-17α-dihydroxy-15-pregnene-11,20-dione and 16-alkylene-3α,17α-dihydroxy-pregnane-11,20-dione which may be represented as follows—

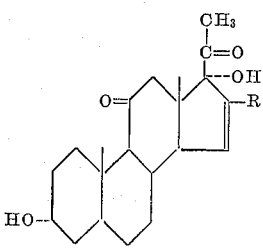

and

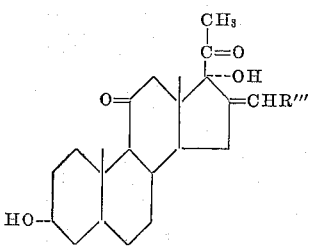

wherein R''' is hydrogen or alkyl and R is as above.

Treatment of the mixture of 16-alkyl-3α,17α-dihydroxy-15-pregnene-11,20-dione and 16-alkylene-3α,17α-dihydroxypregnane-11,20-dione successively with lithium aluminum hydride and sodium metaperiodate results in a mixture of the endocyclic 16-alkyl-3α,11β-dihydroxy-15-etiocholene-17-one and the exocyclic, 16-alkylene-3α,11β-dihydroxyetiocholane-17-one having the structural formula—

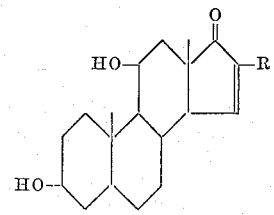

and

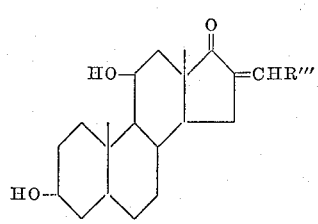

wherein R''' is hydrogen or alkyl and R is alkyl as above.

Upon treatment of 16β-alkyl-16α,17α-epoxy-3α-hydroxy pregnane-11,20-dione with hydrogen bromide in acetic acid there is formed 3α-acetoxy-16-alkylene-17α-hydroxy-pregnane-11,20-dione, uncontaminated with the 15-pregnene isomer. There is also produced 3α-acetoxy-16-alkyl-15-bromo-16-pregnene-11,20-dione which may be represented by the following formula—

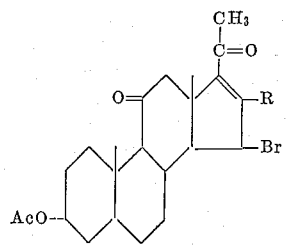

wherein R is alkyl. The 3α-acetoxy-16-alkyl-15-bromo-16-pregnene-11,20-dione thus produced is an important intermediate in the preparation of other active steroids.

The 3α-acetoxy-16-alkyl-15-bromo-16-pregnene-11,20-dione may be reacted with pyridine to form 3α-acetoxy-16-alkyl-14,16-pregnadiene-11,20-dione which has the formula—

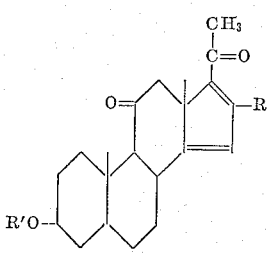

wherein R is alkyl and R' is acetyl; the latter compound may be hydrolyzed to the corresponding 3α-ol which has the above formula wherein R is alkyl and R' is H.

Hydrogenation of the mixture of 16-alkyl-3α,17α-dihydroxy-15-pregnene-11,20-dione and 16-alkylene-3α,17α-dihydroxy-pregnane-11,20-dione with hydrogen in the presence of a hydrogenation catalyst such as palladium on calcium carbonate results in the formation of a mixture of 16α-alkyl-3α,17α-dihydroxypregnane-11,20-dione and 16β-alkyl-3α,17α-dihydroxypregnane-11,20-dione which may be represented as follows

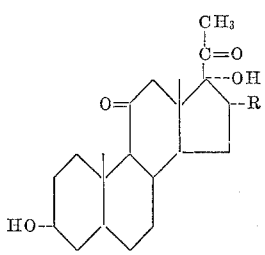

and

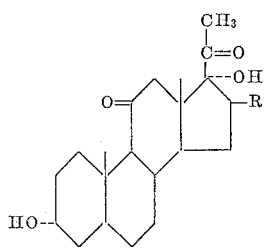

wherein R is as above.

Alternatively, hydrogenation of 16β-alkyl-16α,17α-epoxy-3α-hydroxypregnane-11,20-dione under acidic conditions produces directly the above mixture of 16α-alkyl-3α,17α-dihydroxypregnane-11,20-dione and 16β-alkyl-3α,17α-dihydroxy-pregnane-11,20-dione.

Similarly hydrogenation of the pure 16-alkylene-3α,17α-dihydroxypregnane-11,20-dione resulted in the mixture of 16α-alkyl-3α,17α-dihydroxypregnane-11,20-dione and 16β-alkyl-3α,17α-dihydroxypregnane-11,20-dione.

At this stage, the mixture may be separated into its components by chromatography or fractional crystallization or other means. As hereinafter described the mixture can be processed in the same manner as either of the two components.

Bromination of the above epimeric mixture of 16α-alkyl-3α,17α-dihydroxypregnane-11,20-dione and 16β-alkyl-3α,17α-dihydroxypregnane-11,20-dione results in the formation of an epimeric mixture of 16α-alkyl-21-bromo-3α,17α-dihydroxypregnane-11,20-dione and 16 -alkyl-21-bromo-3α,17α-dihydroxypregnane-11,20-dione which may be represented as follows—

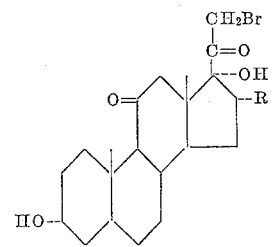

and

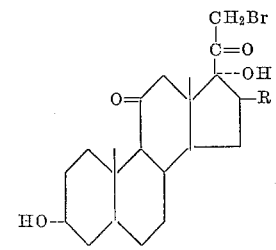

wherein R is as above.

The above epimeric mixture of 16α-alkyl-21-bromo-3α,17α-dihydroxypregnane-11,20-dione and 16β-alkyl-21-bromo-3α,17α-dihydroxypregnane-11,20-dione may be reacted with potassium acetate to form an epimeric mixture of 16α-alkyl-3α,17α,21-trihydroxypregnane-11,20-dione 21-acetate and 16β-alkyl-3α,17α,21-trihydroxypregnane-11,20-dione 21-acetate which may be represented by the following formulae—

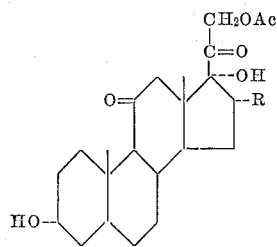

and

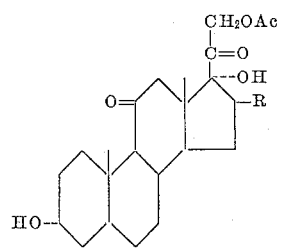

wherein R is as above.

The above epimeric mixture may be separated by chromatography or crystallization at this stage or carried further.

Reaction of a mixture of 16α-alkyl-3α,17α,21-trihydroxy-pregnane-11,20-dione 21-acetate and 16β-alkyl-3α,17α,21-trihydroxypregnane-11,20-dione 21-acetate with an oxidizing agent such as N-bromosuccinimide or chromic acid results in the formation of a mixture of 16α-alkyl-17α,21-dihydroxypregnane-3,11,20-trione 21-acetate and 16β-alkyl-17α,21-dihydroxypregnane-3,11,20-trione 21-acetate which have the following structural formulae—

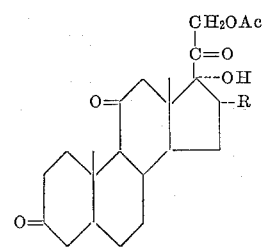

and

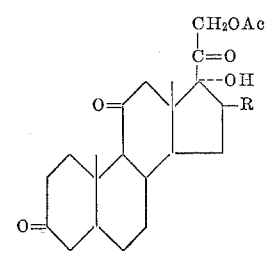

wherein R is as above.

The mixture of 16α-alkyl-17α,21-dihydroxypregnane-3,11,20-trione 21-acetate and 16β-alkyl-17α,21-dihydroxypregnane-3,11,20-trione 21-acetate can be separated by chromatographic procedures.

The 16β-alkyl-17α,21-dihydroxypregnane-3,11,20-trione 21-acetate is reacted with bromine to form 16β-alkyl- 4 - bromo-17α,21-dihydroxypregnane - 3,11,20 - trione 21-acetate which has the following structural formula—

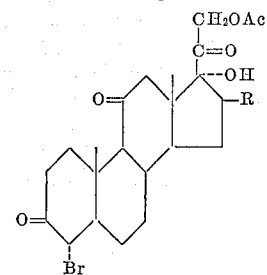

wherein R is alkyl.

The 16β-alkyl - 4 - bromo-17α,21-dihydroxypregnane-3, 11,20-trione 21-acetate obtained above is then reacted with a slurry of semicarbazide hydrochloride and sodium bicarbonate to form the 3-semicarbazone of 16β-alkyl-17α,21-dihydroxy-4-pregnene - 3,11,20 - trione 21-acetate which may be represented by the following structural formula—

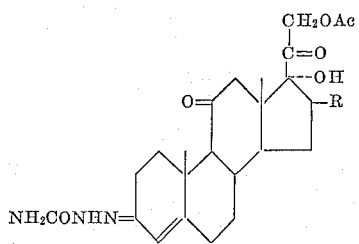

wherein R is as above.

The above 3-semicarbazone of 16β-alkyl-17α,21-dihydroxy-4-pregnene-3,11,20-trione 21-acetate is then reacted with, for example, pyruvic acid in aqueous acetic acid to form 16β-alkyl-17α,21-dihydroxy-4-pregnene-3, 11,20-trione 21-acetate having the following structural formula—

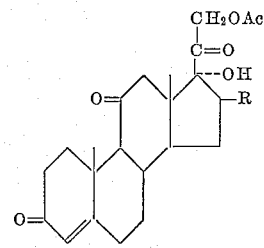

wherein R is as above.

The above compound may also be named 16β-alkyl-cortisone acetate, one of our active end products which possesses effective anti-inflammatory activity.

It has been found that the 16β-alkyl-17α,21-dihydroxy-4-pregnene-3,11,20-trione 21-acetate may be converted to the corresponding 21-ol, namely, 16β-alkyl-17α,21-dihydroxy-4-pregnene-3,11,20-trione, by reaction with potassium bicarbonate in aqueous methanol. The latter compound is then reacted with semicarbazide hydrochloride in the presence of dimethylformamide to form the 3,20-disemicarbazone of 16β-alkyl-17α,21-dihydroxy - 4 - pregnene-3,11,20-trione which has the following structural formula—

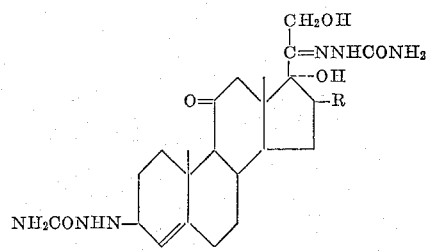

wherein R is alkyl as above.

Reduction of the 3,20-disemicarbazone of 16β-alkyl-17α,12-dihydroxy-4-pregnene-3,11,20-trione with sodium boronhydride produces the 3,20-disemicarbazone of 16β-alkyl-11β,17α,21-trihydroxy - 4 - pregnene - 3,20 - dione, which has the following formula:

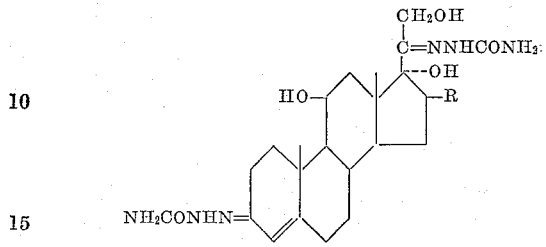

wherein R is as above.

The 3,20-disemicarbazone of 16β-alkyl-11β,17α,21-tri-hydroxy-4-pregnene-3,20-dione is reacted with pyruvic acid in aqueous acetic acid to remove the semicarbazone groups at the 3 and 20-positions to form 16β-alkyl-11β, 17α,21-trihydroxy-4-pregnene-3,20-dione which may be chemically represented as follows:

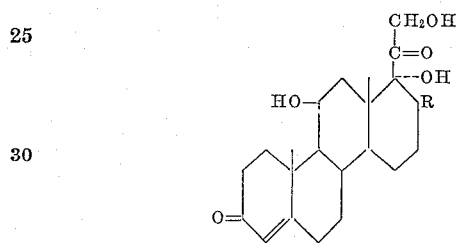

wherein R is above. The above compound which may be called 16β-alkyl hydrocortisone has been found to exhibit marked and effective activity in the treatment of arthritis.

Acetylation of 16β-alkyl-11β,17α,21-trihydroxy-4-pregnene-3,20-dione at the 21-position is accomplished by reacting this latter compound with acetic anyhdride in the presence of pyridine to form 16β-alkyl-11β,17α,21-trihydroxy-4-pregnene-3,20-dione 21-acetate which may be represented as follows:

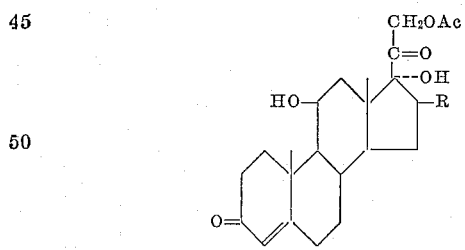

wherein R is as above.

Other 21-acylates may be prepared by reacting the 21-alcohol with the appropriate acyl anhydrides.

By reacting 16β-alkyl-11β,17α,21-trihydroxy-4-pregnene-3,20-dione 21-acetate with methanesulfonyl chloride in dimethylformamide there is formed 16β-alkyl-17α,21-dihydroxy-4,9(11)-pregnadiene-3,20-dione 21-acetate of the following structural formula—

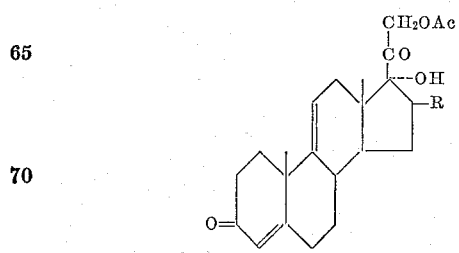

wherein R is as above.

Reacting the latter compound with N-bromo-succinimide forms 16β-alkyl-9α-bromo-11β,17α,21-trihydroxy-4-pregnene-3,20-dione 21-acetate represented by the formula—

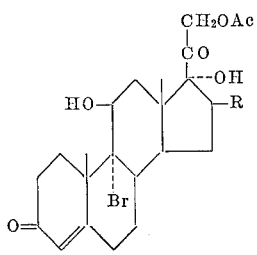

wherein R is as above.

Reacting the latter compound with sodium methoxide produces 16β - alkyl - 9β - 11β - epoxy - 17α,21 - dihydroxy-4-pregnene-3,20-dione having the formula—

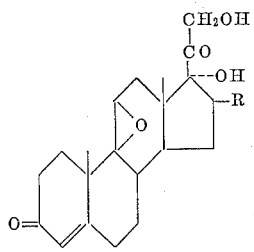

wherein R is as above.

The latter compound is acetylated with acetic anhydride in pyridine and then allowed to react with hydrogen fluoride, to form 16β-alkyl-9α-fluoro-11β,17α,21-trihydroxy-4-pregnene-3,20-dione 21-acetate of the following structural formula:

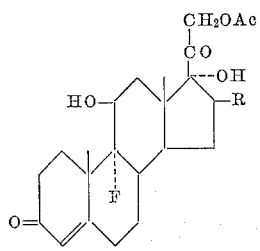

wherein R is as above. The 21-acetate can be readily converted to the corresponding 21-ol, namely, 16β-alkyl-9α - fluoro - 11β,17α,21 - trihydroxy - 4 - pregnene - 3,20-dione by hydrolysis. This latter compound may also be called 16β-alkyl-9α-fluoro-hydrocortisone and it has been found that this compound is very effective in the treatment of arthritis.

In accordance with this invention, 16β-alkyl-17α,21-dihydroxy - 11 - oxygenated - 1,4 - pregnadiene - 3,20-dione and 16β-alkyl-9α-fluoro-17α,21-dihydroxy-11-oxygenated-1,4-pregnadiene-3,20-dione and the corresponding 21-acylates can be prepared by reacting respectively 16β-alkyl - 17α,21 - dihydroxy - 11 - oxygenated - pregnane-3,20-dione 21-acetate and 16β-alkyl-9α-fluoro-17α,21-dihydroxy-11-oxygenated pregnane-3,20-dione 21-acetate with bromine to form the corresponding 16β-alkyl-2,4-dibromo - 17α,21 - dihydroxy - 11 - oxygenated - pregnane-3,20-dione 21-acetate which has the following structural formula:

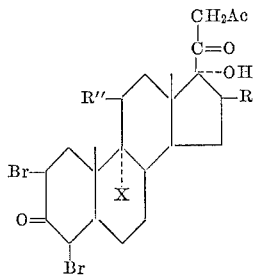

wherein R is as above and X is hydrogen or fluorine and R″ is hydroxy or oxygen.

Treatment of these species with dimethyl aniline in dimethylformamide results in the desired 16β-alkyl-17α,21-dihydroxy - 11 - oxygenated - 1,4 - pregnadiene - 3,20-dione 21-acetate and 16β-alkyl-9α-fluoro-17α,21-dihydroxy - 11 - oxygenated - 1,4 - pregnadiene - 3,20 - dione 21-acetate which may be represented graphically as follows—

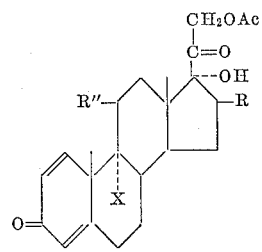

wherein R, R″ and X are as above. The species represented by the above formula are highly potent anti-inflammatory agents.

The 21-acetate esters of these compounds can be hydrolyzed to the corresponding alcohols, 16β-alkyl-17α,21-dihydroxy-11-oxygenated-1,4-pregnadiene-3,20-dione and 16β - alkyl - 9α - fluoro - 17α,21 - dihydroxy - 11 - oxygenated-1,4-pregnadiene-3,20-dione represented by the following structural formula—

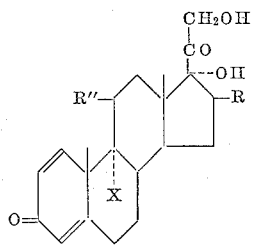

wherein R and R″ are as above.

Alternatively, the 1,4-pregnadiene compounds described above may be prepared from the corresponding 4-pregnene-3-ones by dehydrogenation chemically with selenium dioxide or microbially by means of *Bacillus sphaericus*.

The following experimental part illustrates in detail some of the compounds which constitute this invention and methods for their production However, this invention is not to be construed as limited thereby in spirit or in scope since it will be apparent to those skilled in the art that many modifications in materials and methods may be made without departing from the invention.

EXAMPLE 1

*Preparation of 3α-Acetoxy-16α,17α-Methyleneazo-Pregnane-11,20-Dione*

In a 500 ml. 3-neck flask equipped with condenser, dropping funnel and nitrogen inlet were placed 20 g. of potassium hydroxide in 90 ml. of water, 100 ml. of methanol and 100 ml. of ether. A solution of 10 g. of N-methyl-N-nitrosotosylamide in 50 ml. of ether was placed in the dropping funnel.

Diazomethane was generated by warming the generation flask to 40–45° C. and cautiously adding the N-methyl-N-nitrosotosylamide-ether from the dropping funnel. Nitrogen was utilized to sweep the diazomethane into a solution of 20 g. of 3α-acetoxy-16-pregnene-11,20-dione in 100 ml. of tetrahydrofuran and 120 ml. ether. The process was continued until the steroid solution remained yellow for several hours. The product, 3α-acetoxy-16α,17α-methyleneazo-pregnane-11,20 - dione largely precipitated from the reaction mixture. After 16 hours, the mixture was filtered, washed with ether and dried in air. Yield 14.24 g., M.P. 186–190° C. (dec.), 2nd crop (on concentration) 4.45 g., M.P. 180–187° C., 3rd crop, 1.32 g., M.P. 180–190° C. Total usuable material 20.01 g. (90%).

I.R. $\lambda_{max.}^{CHCl_3}$ 5.78 sh, 5.82, 6.39μ, $\lambda_{max.}^{Nujol}$ 5.73, 5.82, 6.39μ

*Analysis.*—Calculated for $C_{24}H_{34}O_4N_2$: C, 69.55; H, 8.27. Found: C, 69.37; H, 8.01.

EXAMPLE 2

*Preparation of 3α-Acetoxy-16-Methyl-16-Pregnene-11,20-Dione; 3α-Acetoxy-16α,17α-Methylenepregnane-11,20-Dione; 3α-Acetoxy-16-Methylenepregnane-11,20-Dione and 3α-Hydroxy-16-Methyl-16-Pregnene-11,20-Dione*

37.4 g. of 3α-acetoxy-16α,17α-methyleneazopregnane-11,20-dione was placed in a 500 ml. round-bottom flask and heated by an oil bath in vacuo (pressure 0.6 mm.). A manometer and 12-liter surge flask were in the line between the reaction flask and pump trap. When the bath temperature reached 180° C. the 3α-acetoxy-16α,17α-methyleneazo-pregnane-11,20-dione began to melt with evolution of nitrogen. The maximum pressure reached was 83 mm. After 10 minutes at 180–182° C. the melt was cooled. It had $$\lambda_{max.}^{CH_3OH}\ 249,\ E\%\ 191$$

and was taken up in about 150 ml. of acetone, filtered through diatomaceous earth, concentrated to about 100 ml. and ether slowly added to the boiling solution until crystallization occurred. These crystals of 3α-acetoxy-16-methyl-16-pregnene-11,20-dione weighed 19.0 g., M.P. 165–168° C.;

$$\lambda_{max.}^{CH_3OH}\ 249,\ E\%\ 234$$

2nd crop 5.3 g., M.P. 160–164° C., $$\lambda_{max.}^{CH_3OH}\ 249,\ E\%\ 211$$

3rd crop 5.0 g., M.P. 142–153° C., $$\lambda_{max.}^{CH_3OH}\ 249,\ E\%\ 156$$

Total yield of material with E% >210 was 70%. The analytical sample had M.P. 165–167° C.

$\lambda_{max.}^{CH_3OH}$ 249, E% 240; $\lambda_{max.}^{CHCl_3}$ 5.83, 5.90, 6.05, 6.23μ

*Analysis.*—Calculated for $C_{24}H_{34}O_4$: C, 74.57; H, 8.87. Found: C, 74.30; H, 8.60.

The mother liquors obtained above contained additional 3α-acetoxy-16-methyl-16-pregnene-11,20-dione as well as the corresponding isomeric cyclopropane, 3α-acetoxy-16α,17α-methylenepregnane-11,20-dione, M.P. 166–169° C. and exocyclic olefin, 3α-acetoxy-16-methylenepregnane-11,20-dione which were isolated by chromatography.

The latter, 3α-acetoxy-16-methylenepregnane-11,20-dione, was transformed to 3α-hydroxy-16-methyl-16-pregnene-11,20-dione by methanolic potassium hydroxide.

EXAMPLE 3

*Preparation of 16α,17α-Epoxy-3α-Hydroxy-16β-Methylpregnane-11,20-Dione*

A solution of 20.0 g. of 3α-acetoxy-16-methyl-16-pregnene-11,20-dione dissolved in 600 ml. of methanol, was cooled to 18° C., and 80 ml. of 30% hydrogen peroxide followed by 80 ml. of 2.5 N sodium hydroxide were added. Considerable material precipitated from solution, but all redissolved on stirring the reaction mixture at 25°–30° C. for 40 minutes. The solution was kept at 15°–20° C. for 18 hours at which time the ultra-violet maximum at 249 had completely disappeared. Then 600 ml. of saturated salt water was slowly added, the crystalline precipitate was filtered, washed with water, and dried in air and in vacuum. The 16α,17α-epoxy-3α-hydroxy-16β-methylpregnane-11,20-dione thus formed weighed 17.36 g. (93%); M.P. 176–177° C., hexagonal prisms, M.P. 178–180° C., from acetone-ether.

$$\lambda_{max.}^{CHCl_3}\ 2.9–3.0,\ 5.86μ$$

*Analysis.*—Calculated for $C_{22}H_{32}O_4$: C, 73.30; H, 8.95. Found: C, 73.23; H, 9.12.

Room temperature acetylation gave the 3α-acetoxy-16α,17α-epoxy-16β-methylpregnane-11,20-dione having a melting point of 162–164° C.

*Analysis.*—Calculated for $C_{24}H_{34}O_5$: C, 71.65; H, 8.51. Found: C, 71.65; H, 8.25.

EXAMPLE 4

*Preparation of an Olefin Mixture of 3α,17α-Dihydroxy-16-Methyl - 15 - Pregnene-11,20-Dione and 3α,17α-Dihydroxy-16-Methylenepregnane-11,20-Dione*

To a solution of 2.69 g. of 16α,17α-epoxy-3α-hydroxy-16β-methyl-pregnane-11,20-dione in 55 ml. dioxane was added 27 ml. of 2 M aqueous perchloric acid. The clear solution was kept at 25–30° C. for 65 hours. Cold water, (175 ml.) was added, the slurry chilled to 8° C. and filtered after 30 minutes. The precipitate, containing a mixture of 3α,17α - dihydroxy - 16-methyl-15-pregnene-11,20-dione and 3α,17α-dihydroxy-16-methylene-pregnane was washed with water, and dried in air and finally at 50° C. in vacuum. Yield: 2.27 g. (94.5%), M.P. sintering at about 150° C., melting at 158–167° C. The relative proportion of 3α,17α-dihydroxy-16-methyl-15-pregnene-11,20-dione and 3α,17α - dihydroxy-16-methylenepregnane-11,20-dione is estimated to be of the order of 1:1.

EXAMPLE 5

*Preparation of 3α,11β-Dihydroxy-16-Methyl-15-Etiocholene-17-One and 3α,11β-Dihydroxy-16-Methylene-Etiocholane-17-One*

Treatment of the mixture of 3α,17α-dihydroxy-16-methyl-15-pregnene-11,20-dione and 3α,17α-dihydroxy-16-methylene-pregnane-11,20-dione successively with lithium aluminum hydride and sodium periodate gave a crystalline mixture (M.P. 166–171° C.) of endocyclic 3α,11β-dihydroxy-16-methyl-15-etiocholene - 17 - one and exocyclic 3α,11β-dihydroxy-16-methylene-etiocholane-17-one C-17 ketones with $\lambda_{max.}^{CH_3OH}$ 232.5, E% 200; $\lambda_{max.}^{CHCl_3}$ 2.75, 2.8–2.9, 5.80, 5.87, 6.07, 6.21μ

The conjugate C=O peaks at 5.80 and 5.87 were of equal intensity indicating the proportions to be 1:1.

Pure 3α,11β-dihydroxy - 16 - methylene-etiocholane-17-one (M.P. 163–166° C. $\lambda_{max.}^{CH_3OH}$ 227, E% 270; $\lambda_{max.}^{CHCl_3}$ 2.75, 2.82–2.92, 5.79, 6.07)

was prepared similarly from pure 3α-acetoxy-16-methylene-17α-hydroxy-pregnane-11,20-dione obtained by hydrogen bromide opening of the oxide, 3α-acetoxy-16α,17α-epoxy-16β-methyl-pregnane-11,20-dione (see Example 6).

EXAMPLE 6

*Preparation of 3α - Acetoxy-17α-Hydroxy-16-Methylene-Pregnane-11,20-Dione and 3α - Acetoxy-15-Bromo-16-Methyl-16-Pregnene-11,20-Dione*

To a stirred solution of 5.05 g. of 3α-acetoxy-16α,17α-epoxy-16β-methyl-pregnane-11,20-dione in 75 ml. of acetic acid maintained at 10–15° C. was added 25 ml. of cold 15% hydrogen bromide in acetic acid. After 35 minutes at 10°–15° C. the mixture was concentrated to dryness in vacuo (temperature 15° C.) and the residue chromatographed on 200 g. of neutral alumina. From the 60:40 petroleum ether-benzene eluates there was obtained 2.10 g. of 3α - acetoxy-15-bromo-16-methyl-16-pregnene- 11,20-dione; rectangular prisms from ether-acetone, M.P. 130°–135° C., dec., $[\alpha]_D^{CHCl_3}$ +43° (C.=1.01); $\lambda_{max}^{CH_3OH}$ 250 mμ, E=9,000;

$\lambda_{max}^{CHCl_3}$ 5.80, 5.84, 6.00, 6.20μ

*Analysis.*—Calculated for $C_{24}H_{33}O_4Br$: C, 61.93; H, 7.14; Br, 17.17. Found: C, 61.83; H, 6.99; Br, 16.89. From the 50:50 petroleum ether-benzene to 100% benzene eluates there was obtained 1.60 g. 3α-acetoxy-17α-hydroxy - 16 - methylene-pregnane - 11,20 - dione; prisms from acetone-ether, M.P. 198°–200° C.

$[\alpha]_D^{CHCl_3}$ −5.2° (C. 1.00); $\lambda_{max}^{Nujol}$ 2.95, 5.75, 5.82, 5.87 8.00μ

*Analysis.*—Calculated for $C_{24}H_{34}O_5$: C, 71.61; H, 8.51. Found: C, 71.51; H, 8.07.

EXAMPLE 7

*Preparation of 3α-Acetoxy-16-Methyl-14,16-Pregnadiene-11,20-Dione*

42 mg. of 3α-acetoxy-15-bromo-16-methyl-16-pregnene-11,20-dione was dissolved in 2 ml. of pyridine. After 18 hours at 25° C. the mixture was concentrated to dryness in vacuo. The solid residue of 3α-acetoxy-16-methyl-14,16 - pregnadiene - 11,20 - dione was crystallized from ether; prismatic needles, M.P. 180°–185° C;

$\lambda_{max}^{CH_3OH}$ 304 mμ, E=11,000

EXAMPLE 8

A solution of 3.05 g. (8.47 millimols) of the olefin mixture of 3α,17α - dihydroxy - 16 - methyl-15-pregnene-11,20-dione and 3α,17α-dihydroxy - 16 - methylene-pregnane-11,20-dione in 80 ml. of methanol was reduced in hydrogen at 1 atmosphere and 25° C. in the presence of 2.0 g. of 25% palladium-calcium carbonate catalyst. Modification of the hydrogenation conditions, pH, solvent, catalyst, etc. alters the isomer ratio significantly. Uptake of the calculated amount of hydrogen was complete in 45 minutes. The mixture was stirred an additional 30 minutes and filtered through diatomaceous earth. The colorless filtrate was taken to dryness and crystallized from ether: a mixture of 3α,17α-dihydroxy-16α-methyl-pregnane-11,20-dione and 3α,17α-dihydroxy-16β-methyl-pregnane-11,20-dione was obtained and weighed 3.05 g., sintering at 150° C., melting at 166°–182° C.

$\lambda_{max}^{CHCl_3}$ 2.79, 2.95, 5.87μ

The product consists of 3α,17α-dihydroxy-16α-methylpregnane-11,20-dione and 3α,17α-dihydroxy-16β-methylpregnane-11,20-dione in the ratio ca. 7:3 as determined by the amounts of end product isolated below.

EXAMPLE 9

*Alternate Preparation of 3α,17α-Dihydroxy-16α-Methylpregnane - 11,20 - Dione and 3α,17α - Dihydroxy-16β-Methylpregnane-11,20-Dione*

A solution of 10.0 g. of 16α,17α-epoxy-3α-hydroxy-16β-methylpregnane-11,20-dione in 180 ml. of dioxane and 112 ml. of 2 M aqueous perchloric acid was prepared. The solution was hydrogenated at 25° C. and 1 atmosphere pressure in the presence of 4.4 g. of 5% palladium on charcoal catalyst. Uptake of one mole of hydrogen was complete in 10 hours. The catalyst was removed by filtration and 300 ml. of 70% saturated sodium chloride was added to the filtrate. After being kept at 0° C. for 30 minutes, the precipitated mixture of 3α,17α - dihydroxy - 16α - methylpregnane-11,20-dione and 3α,17α-dihydroxy - 16β - methylpregnane-11,20-dione was filtered, washed with water and dried in air. Yield: 9.26 g. Solubility analysis in benzene indicated the product to be 75% 3α,17α-dihydroxy-16α-methylpregnane-11,20-dione and 25% 3α,17α-dihydroxy-16β-methylpregnane-11,20-dione.

EXAMPLE 10

*Separation of 3α,17α - Dihydroxy-16α - Methylpregnane-11,20-Dione and 3α,17α-Dihydroxy - 16β - Methylpregnane-11,20-Dione*

One gram of the above hydrogenation product, 3α,17α-dihydroxy-16α-methylpregnane-11,20-dione and 3α,17α-dihydroxy-16β-methylpregnane-11,20 - dione, was chromatographed on 100 g. of activated magnesium silicate. The 100% chloroform eluates gave 3α,17α-dihydroxy-16α-methylpregnane-11,20-dione, M.P. 188°–191° C., identical with authentic material by mixed melting point and infrared spectral comparisons. The 5% methanol-chloroform eluates gave 3α,17α-dihydroxy-16β-methylpregnane-11,20-dione hexagonal plates from benzene-ethylacetate, M.P. 192°–197° C.;

$\lambda_{max}^{Nujol}$ 2.90–3.05, 5.85–5.90μ

*Analysis.*—Calculated for $C_{22}H_{34}O_4$: C, 72.89; H, 9.45. Found: C, 72.97; H, 9.25.

The 16α-methyl and 16β-methylpregnanes respectively, had $R_F$ values of 0.55 and 0.35 when chromatographed on Whatman #1 filter paper in the benzene-formamide system.

As described hereinafter, 3α,17α-dihydroxy-16β-methyl-pregnane-11,20-dione was brominated at position 21 in exactly the same way as the mixture of 16α and 16β-methyl compounds to give 21-bromo-3α,17α-dihydroxy-16β-methylpregnane-11,20-dione. This latter compound was similarly converted to 3α,17α,21-trihydroxy-16β-methylpregnane-11,20-dione 21-acetate. This compound was then similarly oxidized at position 3 to give 17α,21-dihydroxy-16β-methyl-3,11,20-trione 21-acetate.

EXAMPLE 11

*Preparation of a Mixture of 3α-Acetoxy-17α-Hydroxy-16α-Methyl-Pregnane-11,20-Dione and 3α-Acetoxy-17α-Hydroxy-16β-Methylpregnane-11,20-Dione*

To a mixture of 3α,17α-dihydroxy-16α-methylpregnane-11,20-dione and 3α,17α-dihydroxy-16β-methylpregnane-11,20-dione dissolved in pyridine was added acetic anhydride, at 20° C. A mixture of 3α-acetoxy-17α-hydroxy-16α-methylpregnane-11,20-dione and 3α-acetoxy-17α - hydroxy-16β-methylpregnane-11,20-dione separated from solution and was recovered. These prisms sintered at 170° C. and melted at 175°–179° C.

EXAMPLE 12

*Preparation of a Mixture of 21-Bromo-3α,17α-Dihydroxy-16α-Methylpregnane - 11,20 - Dione and 21-Bromo-3α,17α-Dihydroxy-16β-Methylpregnane-11,20-Dione*

A solution of 3.50 g. (9.7 millimols) of a mixture of 3α,17α - dihydroxy - 16α - methylpregnane - 11,20 - dione and 3α,17α - dihydroxy-16β-methylpregnane-11,20-dione obtained as above in 40 ml. of chloroform was warmed to 40°–45° C. A solution of 1.76 g. (11 millimols) of bromine in 25 ml. of chloroform was added dropwise to the stirred solution such that the color was not darker than pale yellow (ca. 2 drops/sec., total time, 1 hour). The nearly colorless solution was cooled to 20° C. and 200 ml. of ether was added. The mixture was extracted with excess cold 5% potassium bicarbonate solution, sodium bisulfite solution, and water and dried over magnesium sulfate. The colorless residue after removal of solvent, a mixture of 21-bromo-3α,17α-dihydroxy-16α-methylpregnane-11,20-dione and 21-bromo-3α,17α-dihydroxy-16β-methylpregnane-11,20-dione (4.30 g.) gave a positive tetrazolium test. Paper chromatography (benzene-formamide) resolved the material into 2 spots.

EXAMPLE 13

*Preparation of a Mixture of 3α,17α,21-Trihydroxy-16α-Methylpregnane-11,20-Dione 21-Acetate and 3α,17α,21-Trihydroxy - 16β - Methylpregnane - 11,20 - Dione 21-Acetate*

To 4.30 g. of 21-bromo-3α,17α-dihydroxy-16α-methylpregnane-11,20-dione and 21-bromo-3α,17α-dihydroxy-16β-methylpregnane-11,20-dione in 90 ml. of acetone and 0.10 ml. of acetic acid were added 4.83 g. of anhydrous potassium acetate and 3.85 g. of potassium iodide. The stirred mixture was refluxed for 18 hours and concentrated on the water pump to a small volume. Water was added, the product extracted into ethyl acetate, and the organic extract dried over magnesium sulfate. The product (4.25 g.) was a colorless foam that partly crystallized from acetone-ether to give ca. 30% dense cubes sintering at about 150° C., and melting at 200–213° C., which paper chromatography showed was mainly 3α,17α,21-trihydroxy-16β-methylpregnane-11,20-dione 21-acetate contaminated with some 3α,17α,21-trihydroxy-16α-methylpregnane-11,20-dione 21-acetate. The I.R. spectrum of this material was similar to that of authentic 3α,17α,21-trihydroxy-16α-methylpregnane-11,20-dione 21-acetate in the functional group region but differed significantly in the fingerprint region. Seeding the mother liquors with authentic 3α,17α,21 - trihydroxy-16α-methylpregnane-11,20-dione 21-acetate induced crystallization of crude 3α,17α,21 - trihydroxy - 16α - methylpregnane-11,20-dione 21-acetate which was purified by repeated crystallization from acetone-ether and shown to be identical with an authentic sample by mixed M.P., I.R. and paper chromatographic comparisons.

EXAMPLE 14

*Preparation of 17α,21-Dihydroxy-16α-Methylpregnane-3, 11,20-Trione 21-Acetate and 17α,21-Dihydroxy-16β-Methylpregnane-3,11,20-Trione 21-Acetate*

To the mixture obtained as above of 3α,17α,21-trihydroxy-16α-methylpregnane-11,20-dione 21-acetate and 3α,17α,21 - trihydroxy - 16β - methylpregnane - 11,20 - dione 21-acetate, 4.0 g. in 100 ml. t-butanol and 20 ml. of water cooled to 10°–15° C., was added 3.5 g. N-bromo-succinimide. The suspension was stirred at 15° C. until all the N-bromosuccinimide had dissolved (90 minutes). The reaction mixture was kept at 2° C. for about sixteen hours and at 25° C. for 2 hours. Sodium sulfite solution was added to destroy bromine and the mixture concentrated on the water pump to a low volume. A granular precipitate had formed; water was added, the precipitate filtered and washed with water, 3.30 g., sintering at about 170° C. melting at about 202°–212° C. Extraction of the filtrate with ethyl acetate gave .350 g., M.P. 130°–170° C. Since both samples were mixtures by paper chromatography, they were recombined for alumina chromatography. Trituration with 100 ml. hot benzene gave 540 mg. of material, M.P. 225°–235° C. Chromatography of the remainder on neutral alumina (85 g., 100 ml. fractions) gave 1.324 g. of 17α,21-dihydroxy-16α-methylpregnane-3,11,20-trione 21-acetate, M.P. 230° C. from fractions 5–15; (5% CHCl$_3$–70% C$_6$H$_6$). Fractions 17–21 (50% CHCl$_3$–50% C$_6$H$_6$ to 100% CHCl$_3$) contained 0.850 g. 17α,21-dihydroxy-16β-methylpregnane-3, 11,20-trione 21-acetate, M.P. 210–213° C. The yield was about 2.0 g. [1.87 g.+ca. .10–.20 g. in mixed fraction 16]. The ratio of 17α,21-dihydroxy-16α-methylpregnane-3,11,20-trione 21-acetate to 17α,21-dihydroxy-16β - methylpregnane - 3,11,20 - trione 21 - acetate, 2.0:0.85=7:3, is probably close to the ratio of 3α,17α-dihydroxy-16α-methylpregnane-11,20-dione produced in the hydrogenation.

Pure 17α,21-dihydroxy-16β-methylpregnane-3,11,20-trione 21-acetate had the following properties: M.P. 210–212° C.

$\lambda_{max}^{CHCl_3}$ 2.92, 5.76, 5.81, 5.87μ; $[\alpha]_D^{CHCl_3}$ +130° (C.=.950)

*Analysis.*—Calculated for C$_{24}$H$_{34}$O$_6$: C, 68.88; H, 8.19. Found: C, 68.81; H, 7.91.

EXAMPLE 15

*Preparation of 4-Bromo-17α,21-Dihydroxy-16β-Methylpregnane-3,11,20-Trione 21-Acetate*

To a stirred solution of 585 mg. of 17α,21-dihydroxy-16β-methylpregnane-3,11,20-trione 21-acetate in 10 ml. of acetic acid and 8 ml. of chloroform kept at −10° C. was added slowly 230 mg. of bromine in 6 ml. of chloroform. After addition was complete, 1.2 g. of sodium acetate in 7 ml. of cold water was added. Additional water was added and the mixture was extracted with chloroform. The chloroform extract was washed with dilute potassium bicarbonate, water and dried over sodium sulfate. The residue was triturated with ether to give 480 mg. of crystalline 4-bromo-17α,21-dihydroxy-16β-methylpregnane-3,11,20-trione 21-acetate, M.P. 165–170° C. dec.

*Analysis.*—Calculated for C$_{24}$H$_{33}$O$_6$Br: Br, 16.08. Found: Br. 15.58.

A second crop of 133 mg. of 4-bromo-17α,21-dihydroxy-16β-methylpregnane-3,11,20-trione 21-acetate was also obtained.

EXAMPLE 16

*Preparation of the 3-Semicarbazone of 17α,21-dihydroxy-16β-Methyl-4-Pregnene-3,11,20-Trione 21-Acetate*

To 583 mg. of 4-bromo-17α,21-dihydroxy-16β-methylpregnane-3,11,20-trione 21-acetate in 20 ml. of acetonitrile under nitrogen was added a slurry of 600 mg. of semicarbazide hydrochloride and 410 mg. sodium bicarbonate in 4 ml. of water. After 2 hours, the acetonitrile was removed in vacuo, water added and 540 mg. of crystalline 3-semicarbazone of 17α,21-dihydroxy-16β-methyl-4-pregnene-3,11,20-trione 21-acetate filtered, washed with water and dried.

EXAMPLE 17

*Preparation of 17α,21-Dihydroxy-16β-Methyl-4-Pregnene-3,11,20-Trione 21-Acetate*

540 mg. of the semicarbazone of 17α,21-dihydroxy-16β-methyl-4-pregnene-3,11,20-trione 21-acetate was dissolved in 20 ml. of acetic acid, 1.5 ml. of pyruvic acid and 5 ml. of water. After 18 hours at 25° C., water was added and the mixture extracted with chloroform. The chloroform extract was washed with aqueous potassium bicarbonate, water and dried over sodium sulfate. Removal of solvent gave crude 17α,21-dihydroxy-16β-methyl-4-pregnene-3,11,20-trione 21-acetate which was purified by chromatography on neutral alumina and crystallization from acetone-ether (hexagonal plates). The pure material had M.P. 226°–232° C.

$\lambda_{max}^{CH_3OH}$ 238 mμ, E=15,600; $\lambda_{max}^{CHCl_3}$ 2.85–2.98, 5.73, 5.79, 5.85, 6.00, 6.18μ; $[\alpha]_D^{CHCl_3}$ +252 (C.=.640°)

*Analysis.*—Calculated for C$_{24}$H$_{32}$O$_6$: C, 69.21; H, 7.75. Found: C, 69.24; H, 7.58.

EXAMPLE 18

*Preparation of the 3,20-Disemicarbazone of 17α,21-Dihydroxy-16β-Methyl - 4 - Pregnene - 3,11,20-Trione 21-Acetate*

To a stirred solution of 500 mg. of 17α,21-dihydroxy-16β-methyl - 4 - pregnene - 3,11,20-trione 21-acetate (prepared as described in Example 17) in 12.5 ml. of methanol and 3 ml. of dimethylformamide kept under nitrogen was added a slurry of 680 mg. of semicarbazide hydrochloride and 370 mg. of sodium bicarbonate in 1 ml. of water. The stirred mixture was refluxed 3½ hours and maintained at 45° C. for 17 hours. It was then cooled to 20° C. and 50 ml. of 50% saturated aqueous sodium chloride was added. After 2 hours at 0° C. the precipitate of the 3,20-disemicarbazidone of 17α,21-dihydroxy-16β-methyl - 4 - pregnene-3,11,20-trione 21-acetate was filtered, washed with water until free of chloride ion and dried in air. Yield over 90%.

EXAMPLE 19

*Preparation of the 3,20-Disemicarbazone of 11β,17α,21-Trihydroxy-16β-Methyl-4-Pregnene-3,20-Dione*

To a stirred solution of 600 mg. of the 3,20-disemicarbazone of 17α,21-dihydroxy-16β-methyl-4-pregnene-3,11,20-trione 21-acetate in 30 ml. of tetrahydrofuran and 11 ml. of water under nitrogen was added 200 mg. powdered sodium borohydride. The stirred suspension was refluxed 45 minutes and then cooled to 15° C. Aqueous acetic acid (3 ml. of 30%) was added cautiously and most of the tetrahydrofuran was removed in vacuum. Addition of 5 ml. of methanol and 5 ml. of water induced the product to crystallize. Following addition of 10 ml. of a saturated sodium chloride solution and aging at 0° C. the product 3,20-disemicarbazone of 11β,17α,21-trihydroxy-16β-methyl - 4 - pregnene - 3,20 - dione was filtered, washed with water, and dried in air.

EXAMPLE 20

*Preparation of 11β,17α,21-Trihydroxy-16β-Methyl-4-Pregnene-3,20-Dione*

To a solution of 510 mg. of reduced 3,20-disemicarbazone of 11β,17α,21 - trihydroxy-16β-methyl-4-pregnene-3,20-dione in 5 ml. of acetic acid was added 1.20 ml. of water and 0.50 ml. of pyruvic acid. The solution was kept at 25° C. for eighteen hours. Water (20 ml.) was added, and the mixture was extracted thoroughly with chloroform. The chloroform extract was dried over magnesium sulfate and taken to dryness. The residue was crystallized from acetone-ether to give pure 11β,17α,21-trihydroxy-16β-methyl-4-pregnene-3,20-dione.

EXAMPLE 21

*Preparation of 11β,17α,21-Trihydroxy-16β-Methyl-4-Pregnene-3,20-Dione 21-Acetate*

The product of the previous Example 20 was acetylated at C–21 as follows: A solution of 100 mg. of 11β,17α,21-trihydroxy-16β-methyl-4-pregnene-3,20-dione in 100 ml. of pyridine and 0.5 ml. of acetic anhydride was prepared. After 18 hours at 25° C., the solution was taken to dryness in vacuo and the solid residue purified by crystallization in acetone-ether to give 11β,17α,21-trihydroxy-16β-methyl-4-pregnene-3,20-dione 21-acetate.

EXAMPLE 22

*Preparation of 17α, 21-Dihydroxy-16β-Methyl-4,9(11)-Pregnadiene-3,20-Dione 21-Acetate*

A solution of 400 mg. of 11β,17α,21-trihydroxy-16β-methyl-4-pregnene-3,20-dione 21-acetate in 2.0 ml. dimethyl formamide, 0.8 ml. of pyridine and 0.4 ml. of methanesulfonyl chloride was kept at 75° C. for one hour. The mixture was cooled, water added, and the precipitate filtered, washed with water and dried in air. The desired 17α,21-dihydroxy-16β-methyl-4,9(11)-pregnadiene-3,20-dione 21-acetate was purified by chromatography on alumina (20 g.) and elution of the column with benzene. Crystallization of material eluted by benzene gave pure 17α,21-dihydroxy-16β-methyl-4,9(11)-pregnadiene-3,20-dione 21-acetate.

EXAMPLE 23

*Preparation of 9α-Bromo-11β,17α,21-Trihydroxy-16β-Methyl-4-Pregnene-3,20-Dione 21-Acetate*

To a mixture of 620 mg. of 17α,21-dihydroxy-16β-methyl - 4,9(11) - pregnadiene - 3,20-dione 21-acetate and 330 mg. of N-bromosuccinimide in 10 ml. of dioxane and 3.2 ml. of water cooled to 10° C. was added 1.8 ml. of cold 1 M aqueous perchloric acid. The mixture was stirred at 15° C. for 3 hours. Excess N-bromosuccinimide was destroyed by addition of aqueous sodium thiosulfate and most of the dioxane was removed in vacuo. About 30 ml. of water was added and crystalline bromohydrin, 9α-bromo - 11β,17α,21 - trihydroxy-16β-methyl-4-pregnene-3,20-dione 21-acetate, was filtered, washed with water, and dried in air.

EXAMPLE 24

*Preparation of 9β,11β-Epoxy-17α,21-Dihydroxy-16β-Methyl-4-Pregnene-3,20-Dione 21-Acetate*

To a stirred solution of 100 mg. of the 9α-bromo-11β,17α,21-trihydroxy-16β-methyl-4-pregnene-3,20-dione 21-acetate in 3 ml. of tetrahydrofuran and 1 ml. of methanol under nitrogen was added 1.02 ml. of 0.215 N methanolic sodium methoxide. After 10 minutes at 25° C. 0.2 ml. of acetic acid was added and the methanol removed in vacuo. The residue was acetylated with 1.00 ml. of pyridine and 0.5 ml. of acetic anhydride at 60° C. for 70 minutes. The mixture was taken to dryness in vacuo, water added, and the product extracted into chloroform. The residue was crystallized from ether-acetone to give pure 9β,11β-epoxy-17α,21-dihydroxy-16β-methyl-4-pregnene-3,20-dione 21-acetate.

EXAMPLE 25

*Preparation of 9α-Fluoro-11β,17α,21-Trihydroxy-16β-Methyl-4-Pregnene-3,20-Dione 21-Acetate*

To a solution of 200 mg. of 9β,11β-epoxy-17α,21-dihydroxy-16β-methyl-4-pregnene-3,20-dione 21-acetate in 2 ml. of chloroform and 2 ml. of tetrahydrofuran in a polyethylene bottle at −60° C. was added 2 ml. of a 2:1 (by weight) mixture of anhydrous hydrogen fluoride and tetrahydrofuran. After 4 hours at −10° C. the mixture was cooled to −60° C. and cautiously added to a stirred mixture of 30 ml. of 25% aqueous potassium carbonate and 25 ml. of chloroform kept at −5° C. The aqueous phase was further extracted with chloroform and the latter phase washed with water and dried over magnesium sulfate. The residue on crystallization from acetone-ether gave pure 9α-fluoro-11β,17α,21-trihydroxy-16β-methyl-4-pregnene-3,20-dione 21 - acetate.

EXAMPLE 26

*Preparation of 9α-Fluoro-11β,17α,21-Trihydroxy-16β-Methyl-4-Pregnene-3,20-Dione*

To a stirred solution of 110 mg. of 9α-fluoro-11β,17α,21-trihydroxy-16β-methyl-4-pregnene-3,20-dione 21 - acetate in 5 ml. of methanol under nitrogen at 25° C. was added 1.00 ml. of 0.26 M methanolic sodium methoxide. After 15 minutes 0.2 ml. of acetic acid in 1 ml. of water was added and the mixture concentrated nearly to dryness. The residue was taken up in ethyl acetate and the ethyl acetate solution was washed with water, dried over magnesium sulfate, and concentrated to dryness. Crystallization of the residue from ethyl acetate gave pure 9α-fluoro-11β,17α,21-trihydroxy-16β-methyl-4-pregnene-3,20-dione.

EXAMPLE 27

*Preparation of 9α-Chloro-11β,17α-21-Trihydroxy-16β-Methyl-4-Pregnene-3,20-Dione 21-Acetate*

To a solution of 100 mg. of 9β,11β-epoxy-17α,21-dihydroxy-16β-methyl-4-pregnene-3,20-dione 21-acetate in 4 ml. of chloroform was added 5 ml. of concentrated hydrochloric acid. The two-phase mixture was stirred at 25° C. for 1 hour. Addition of water and chloroform extraction gave a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether afforded pure 9α - chloro - 11β,17α,21 - trihydroxy - 16β - methyl - 4 - pregnene-3,20-dione 21-acetate.

EXAMPLE 28

*Preparation of 2,4-Dibromo-17α,21-Dihydroxy-16β-Methylpregnane-3,11,20-Trione 21-Acetate*

To a stirred solution of 682 mg. of 17α,21-dihydroxy-16β-methylpregnane-3,11,20-trione 21-acetate (prepared as described in Example 17) in 20 ml. of chloroform and 2.25 ml. of acetic acid maintained at −20° C. was added dropwise one-half of a solution of 540 mg. of bromine in 2 ml. of chloroform and 3 ml. of acetic acid. The mixture was warmed to 0° C. and the remainder of the bromine added. Sodium acetate (0.4 g.) in 2 ml. of water was added followed by 20 mg. of sodium sulfite. The mixture was concentrated in vacuo to remove the chloroform and 20 ml. of water was added. The white powdery precipitate of 2,4-dibromo-17α,21-dihydroxy - 16β - methylpregnane-3,11,20-trione 21-acetate was filtered, washed with water and dried in air. Yield: 920 mg., M.P. 122–130° C. dec.

EXAMPLE 29

*Preparation of 17α,21-Dihydroxy-16β-Methyl-1,4-Pregnadiene-3,11,20-Trione 21-Acetate*

To a solution under nitrogen of 900 mg. of the 2,4-dibromo - 17α,21 - dihydroxy - 16β - methylpregnane - 3,11,20-trione 21-acetate in 5 ml. dimethyl formamide was added 200 mg. of sodium bromide. After 1 hour at 25° C., 1 ml. of dimethylaniline was added and the mixture maintained at 135° C. for 2½ hours. The mixture was cooled, added dropwise to dilute hydrochloric acid, and solid, crude product filtered, washed with dilute hydrochloric acid, water and dried in air. Treatment with charcoal, followed by crystallization from acetone gave 17α,21 - dihydroxy - 16β - methyl - 1,4 - pregnadiene - 3,11,20-trione 21-acetate, M.P. 230–233° C., $\lambda_{max.}^{CH_3OH}$ 238 mμ (E=15,300); $\lambda_{max.}^{CHCl_3}$ 2.9–3.0, 5.75, 5.79, 5.84, 6.01, 6.16, 6.19, 11.20μ; $[\alpha]_D^{CHCl_3}$ +216 (C.=.805)

*Analysis.*—Calculated for $C_{24}H_{30}O_6$: C, 69.55; H, 7.30. Found: C, 69.25; H, 7.25.

EXAMPLE 30

*Preparation of 17α,21-Dihydroxy-16β-Methyl-1,4-Pregnadiene-3,11,20-Trione*

This compound was obtained by treatment of 1.0 g. of 17α,21 - dihydroxy - 16β-methyl-1,4-pregnadiene-3,11,20-trione 21-acetate in 30 ml. of methanol with 1 g. of potassium bicarbonate in 10 ml. of water under nitrogen at reflux temperature for 7 minutes. The mixture was cooled, neutralized with 1 ml. of acetic acid in 10 ml. of water, the methanol removed in vacuo and the product extracted into ethyl acetate. Removal of the ethyl acetate gave crystals (900 mg.), M.P. 195–200, of the desired 17α,21-dihydroxy-16β-methyl-1,4-pregnadiene-3,11,20-trione.

EXAMPLE 31

*Preparation of 11β,17α,21-Trihydroxy-16β-Methyl-1,4 Pregnadiene-3,20-Dione 21-Acetate*

To 100 mg. of 11β,17α,21-trihydroxy-16β-methyl-4-pregnene-3,20-dione 21-acetate in 5 ml. of t-butanol and 0.1 ml. of acetic acid was added 50 mg. of selenium dioxide. The mixture was refluxed under nitrogen 18 hours, 50 mg. of selenium dioxide was added and the mixture refluxed an additional 24 hours. The mixture was filtered, and the filtrate taken to dryness. The residue was taken up in ethyl acetate and washed successively with aqueous sodium bicarbonate, ammonium sulfide, dilute ammonia water, water, dilute hydrochloric acid and water and dried over magnesium sulfate. It was then treated with activated charcoal and concentrated to dryness. Crystallization of the residue from acetone-ether gave pure 11β,17α,21-trihydroxy-16β-methyl-1,4-pregnadiene-3,20-dione 21-acetate.

EXAMPLE 32

Alternately, the 1,2-dehydrogenation of 11β,17α,21-trihydroxy-16β-methyl-4-pregnene-3,20-dione 21-acetate can be carried out microbiologically by means of *Bacillus sphaericus* to yield 11β,17α,21-trihydroxy-16β-methyl-1,4-pregnadiene-3,20-dione, which on acetylation with acetic anhydride-pyridine gives 11β,17α,21-trihydroxy-16β-methyl-1,4-pregnadiene-3,20-dione 21-acetate.

EXAMPLE 33

*Preparation of 9α-Fluoro-11β,17α,21-Trihydroxy-16β-Methyl-1,4-Pregnadiene-3,20-Dione 21-Acetate*

In a similar manner, 100 mg. of 9α-fluoro-11β,17α,21-trihydroxy-16β-methyl-4-pregnene-3,20-dione 21 - acetate was treated with selenium dioxide to produce the corresponding 9α-fluoro-11β,17α,21 - trihydroxy - 16β - methyl-1,4 - pregnadiene - 3,20 - dione 21 - acetate. Alternately, *Bacillus sphaericus* may be utilized. The 21-alcohol was prepared from the 21-acetate as in Example 26 or Example 30.

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:
1. The process which comprises reacting a mixture of 16α-alkyl-3α,17α,21-trihydroxypregnane - 11,20-dione 21-acylate and 16β - alkyl - 3α,17α,21 - trihydroxypregnane-11,20-dione 21-acylate with N-bromosuccinimide to form a mixture of 16α-alkyl-17α,21-dihydroxypregnane-3,11,20-trione 21-acylate and 16β-alkyl-17α,21-dihydroxypregnane-3,11,20-trione 21-acylate and chromatographically separating the said latter mixture.
2. The process which comprises reacting 16β-alkyl-3α,17α,21 - trihydroxypregnane - 11,20 - dione 21-acylate with N-bromosuccinimide to form 16β-alkyl-17α,21-dihydroxypregnane-3,11,20-trione 21-acylate.

References Cited in the file of this patent

UNITED STATES PATENTS

| | | |
|---|---|---|
| 2,783,254 | Gould et al. | Feb. 26, 1957 |
| 2,832,773 | Farrar et al. | Apr. 29, 1958 |
| 2,838,498 | Magerlein et al. | June 10, 1958 |
| 2,954,326 | McAleer et al. | Sept. 27, 1960 |

FOREIGN PATENTS

| | | |
|---|---|---|
| 712,058 | Great Britain | July 14, 1954 |
| 773,016 | Great Britain | Apr. 17, 1957 |
| 788,306 | Great Britain | Dec. 23, 1957 |

OTHER REFERENCES

Klyne et al.: J. Chem. Soc. (1956), pp. 4825–28.
Wendler et al.: J.A.C.S. 73, 3818–3820 (1951).
Meystre et al.: Helv. Chim. Acta 39, 734–742 (1956).
Ringold et al.: J. Org. Chem. 21, 239–40 (1956).
Szpilfogel et al.: Rec. Trav. Chem. 75, 475–80 (1956).
Marker et al.: J.A.C.S. 64, 1280 (1942).